United States Patent [19]

Schutt et al.

[11] Patent Number: 5,929,159
[45] Date of Patent: Jul. 27, 1999

[54] OLIGOMERIC SILICON COATING COMPOSITIONS, ARTICLES COATED THEREWITH AND METHOD FOR FORMING COATING COMPOSITION AND COATED ARTICLES BASED THEREON

[75] Inventors: John B. Schutt, Silver Spring, Md.; Anthony A. Gedeon, Palm Coast, Fla.

[73] Assignee: Adsil LC, Palm Coast, Fla.

[21] Appl. No.: 08/956,782

[22] Filed: Oct. 23, 1997

Related U.S. Application Data

[60] Provisional application No. 60/029,468, Oct. 25, 1996.
[51] Int. Cl.$^6$ ...................................................... C08L 27/12
[52] U.S. Cl. ........................... 524/544; 524/546; 524/588; 524/834; 524/837
[58] Field of Search .................................... 524/546, 588, 524/837, 834, 544

[56] References Cited

U.S. PATENT DOCUMENTS

| | | |
|---|---|---|
| 3,944,702 | 3/1976 | Clark . |
| 3,976,497 | 8/1976 | Clark . |
| 3,986,997 | 10/1976 | Clark . |
| 4,027,073 | 5/1977 | Clark . |
| 4,463,114 | 7/1984 | Balchunis et al. . |
| 4,804,701 | 2/1989 | Fonte et al. . |
| 4,871,788 | 10/1989 | Plueddemann . |

*Primary Examiner*—Melvyn I. Marquis
*Attorney, Agent, or Firm*—Sherman and Shalloway

[57] ABSTRACT

Corrosion resistant coatings are provided by aqueous-alcoholic acidic dispersions of the partial condensate of monomethyl silanol (by hydrolysis of monomethyl alkoxysilane) alone or in admixture with minor amounts of other silanol, e.g., gamma-glycidyloxy silanol, phenyl silanol, etc, wherein the dispersions contain divalent metal cations, e.g., $Ca^{+2}$, in place of all or most of colloidal silica used in prior formulations of this type. The coatings may be applied to boat hulls, including aluminum hulls and are effective in preventing corrosion from salt water for extended periods.

25 Claims, No Drawings

OLIGOMERIC SILICON COATING COMPOSITIONS, ARTICLES COATED THEREWITH AND METHOD FOR FORMING COATING COMPOSITION AND COATED ARTICLES BASED THEREON

This application relates to a Disclosure Document filed on Aug. 24, 1996 in the name of John B. Schutt. This application claims priority from provisional application Ser. No. 60/029,468 filed Oct. 25, 1996.

BACKGROUND OF THE INVENTION

1. Field of the Invention

This invention relates to protective coating compositions. More particularly, this invention relates to aqueous oligomeric silicon coating compositions which when applied to various substrates provide a hard corrosion resistant coating. The compositions which do not include pigment are substantially transparent. The invention also relates to the coated articles and to the methods for coating articles using the aqueous oligomeric silicon coating composition as well as to the method for forming the coating compositions.

2. Discussion of Prior Art

The closest prior art known to Applicant includes four patents issued to Dow Corning in the name of H. A. Clark. These patents include U.S. Pat. Nos. 3,986,997; 4,027,073; 3,976,497; and 3,944,702. The disclosures of these patents are incorporated herein in their entireties by reference thereto. The '997 and '073 patents describe coating compositions primarily intended to provide a hard protective surface to soft plastic sheet material, especially eyeglass lenses. Coating of metal, including aluminum, is also described. These coating compositions are acidic dispersions of colloidal silica and hydroxylated silsesquioxane in an alcohol-water medium. The coating compositions of '497 and '702 also include colloidal silica.

The present invention is based, in part, on the discovery that colloidal silica, especially when used in or near the amounts contemplated by the above Dow Corning (Clark) patents, renders the coatings porous or microporous and drastically reduces the corrosion resistance of the coatings.

The present invention overcomes these and other drawbacks of known corrosion and abrasion resistant silicon-based coating compositions.

SUMMARY OF INVENTION

Accordingly, it is an object of the invention to provide a composition suitable as a corrosion control coating for metals and other substrates.

It is another object of the invention to provide abrasion resistant coating compositions suitable for metallic and non-metallic surfaces.

A still further object of the invention is to provide transparent, glass-like abrasion-resistant and corrosion resistant coating compositions as well as coated articles.

Still yet a further object of this invention is to provide such improved coating compositions as aqueous formulations with low volatile organic component (VOC) levels and, therefore, environmentally acceptable.

Another object of this invention is to provide such coating compositions which may be prepared easily and economically and are easy to apply to various types of substrates.

A specific object of this invention is a coating composition suitable for coating marine surfaces, such as aluminum boat hulls, to render the surfaces corrosion resistant in a salt water environment.

These and other objects of the invention which will become apparent from the following description of general and preferred embodiments is achieved in one aspect of the invention by an aqueous coating composition which may be broadly described as an aqueous coating composition of an oligomeric siloxane binder and divalent metallic ($M^{+2}$) ions dispersed in an aqueous-alcoholic solvent system.

In a particular aspect of the invention there is provided a two-part coating composition. The first part or component is in the form of an acidic aqueous solution containing divalent metallic ions ($M^{+2}$). The second part or component is non-aqueous and contains a precursor of the siloxane oligomer, preferably methyltrimethoxy silane alone or in admixture with copolymerizable silane monomer(s).

The aqueous coating composition of this invention may be prepared by combining the above two mixtures whereby the siloxane oligomeric binder (also referred to as "siloxanol polymer") is synthesized in situ. When applied to a suitable substrate, e.g., metal such as steel or aluminum, the siloxane oligomeric binder further condenses to form the corresponding silsesquioxane.

The aqueous coating composition is applied to a metallic or non-metallic substrate to form a hard, abrasion-resistant, generally transparent, and corrosion-resistant surface coating. The composition is generally applied by manually spreading, that is, by wiping or brushing, although spraying may also be used, on a substrate which has been pre-treated with an acidic cleaning agent which may be or include the invention coating composition itself. Curing of the coating may be accelerated by application of heat such as up to about 80° C.

The resulting coated articles have strongly adherent, transparent protective surface coatings which, depending on the porosity of the substrate, may extend from about several millimeters below the surface for smooth surface materials, e.g., metals, to throughout the entirety or majority of porous substrates such as concrete.

More particularly, the present invention provides an aqueous coating composition comprising a dispersion of divalent metal cations (such as $Ca^{+2}$, $Mn^{+2}$, $Cu^{+2}$, and $Zn^{+2}$) in an aqueous lower aliphatic alcohol solution of the partial condensate of at least one silanol of the formula $RSi(OH)_3$ in which R is a radical selected from the group consisting of lower alkyl, vinyl, phenyl, 3,3,3-trifluoropropyl, gamma-glycidyloxypropyl and gamma-methacryloxypropyl, at least about 70 weight percent of the silanol being $CH_3Si(OH)_3$, acid in an amount sufficient to provide a pH in the range of from about 2.5 to about 6.2, and said divalent cations in an amount of from about 1.2 millimoles to about 2.4 millimoles per molar equivalent of the partial condensate, calculated as methyl silane sesquioxide.

The compositions may or may not include pigment. When pigment is not included the composition cures to a transparent glass-like finish. When pigment is present, a preferred pigment is particulate polytetrafluoroethylene.

The compositions are generally free of colloidal silica, however, minor amounts of colloidal silica (e.g., a 50% colloidal silica sol) may be included in an amount to provide up to about 40% of silane equivalent of the partial condensate, calculated as methyl silane sesquioxide.

The compositions of the invention may be provided as a two-part coating composition. The first part or component is an acidic (pH of from about 2.2 to 2.8) aqueous-alcoholic solution containing the divalent metallic ions ($M^{+2}$)

(wherein M is Ca, Mn, Cu, Zn or mixtures thereof) in an amount sufficient to provide at least about 1.2 millimoles per molar equivalent of methyl silane sesquioxide calculated from the molar silane equivalents of silane contained in the second part or component. The second part is non-aqueous and contains at least one trialkoxy silane of the formula $RSi(OR^1)_3$, wherein R is as defined above, and $R^1$ is a hydrolyzable hydrocarbyl radical, preferably a $C_1-C_6$ lower alkyl group, such as, methyl, ethyl, isopropyl, t-butoxy, at least 70 percent by weight of silane being $CH_3Si(OCH_3)_3$.

The aqueous coating composition will normally be prepared shortly prior to applying to a substrate by combining the first and second parts, usually by adding the non-aqueous silane-containing second part to the acidic aqueous first part while mixing, whereby the silane or silane mixture will hydrolyze to the corresponding silanol(s) which, in turn condenses to form a partial condensate (siloxanol polymer) and raise the pH to a final pH in the range of from about 2.5 to about 6.2, preferably from about 2.8 to about 6.0, more preferably from about 3.0 to about 6.0.

After the pH rises to the above level the composition is ready to be applied to a substrate, such as a metal or plastic substrate, whereupon the composition will dry and the binder undergoes further condensation (curing) at ambient or elevated temperature conditions, to form a silsesquioxane, $RSiO_{3/2}$, where R is as defined above, predominantly methyl silane sesquioxide, $CH_3SiO_{3/2}$.

DETAILED DESCRIPTION AND PREFERRED EMBODIMENTS

As used herein and in the following examples and in the appended claims all parts and percentages are given on a weight basis, unless otherwise noted.

Silicone, siloxane, silane and silicate based coating compositions are well known. Generally, when the silicon atom is both trifunctionally and quadrifunctionally hydroxylated, the resulting siloxane network accommodates minimally the passage of water vapor and in some circumstances also the passage of water as well as oxygen. Because of this property, bonding resulting from the hydroxylation at a metallic interface is incomplete and corrosion can occur. The present coating compositions better utilize the reactivity of the silanol moiety with substrate oxy and hydroxy species and promote the formation of a contiguous interfacial layer unaffected by surface and bulk diffusion of water, water vapor and oxygen. This is accomplished, at least in part, by replacing all or most of the colloidal silica in formulations of the type described in the Dow Corning (Clark) patents mentioned above with divalent metal ($M^{+2}$) ions, such as, for example, $Cu^{+2}$, $Zn^{+2}$, $Ca^{+2}$, $Co^{+2}$, and $Mn^{+2}$.

In accordance with the present invention, a siloxane oligomeric (siloxanol polymer) binder is synthesized in situ from methyltrimethoxy silane to form a partial condensate of methyl trisilanol. A copolymer may also be formed from cohydrolyzed silanol, $RSi(OH)_3$, of which methyl trisilanol comprises at least about 70% by weight, preferably at least about 75% by weight, and wherein R is a non-reactive organic moiety, such as, for example, e.g., lower alkyl, i.e., $C_1-C_6$ alkyl, especially $C_1-C_3$ alkyl, e.g., methyl, ethyl or n- or iso-propyl, vinyl, 3,3,3-trifluoropropyl, gamma-glycidyloxypropy, gamma-methacryloxypropyl, and phenyl.

To meet current volatile organic component (VOC) requirements established by the Environmental Protection Agency (EPA) (3.5 pounds per gallon or less), while at the same time establishing an interfacial corrosion barrier, the present compositions will generally include, on a weight basis of the total composition, from about 28 to 71%, preferably from about 31 to 71% silanol (of which at least about 70% is methylsilanol), from about 29% to about 39% water, from 0 to about 31%, preferably from about 15 to about 30%, isopropanol or other volatile organic solvent, and an $M^{+2}$ ion or a mixture of such $M^{+2}$ ions, within the range of from about 0.5 to 3 millimoles (gram·millimoles) preferably about 1.2 to 2.4 millimoles, per molar equivalent of the partial condensate calculated as methyl silane sesquioxide. The pH of the mixture is adjusted to mildly to slightly acidic, such as between 2.5 and 6.2, preferably 2.8 to 6.0, more preferably 3.0 to 6.0. As previously mentioned, the volatiles, e.g., methanol and/or isopropanol, or other lower alcohol, etc. may combine to a level no greater than 3.5 pounds per gallon in the presence of the condensate, water, ion solution and acid. However, in practice, because the coating composition is applied so thinly VOC levels are, generally, not measurable. Furthermore, particularly for coating metal surfaces, water levels should be maintained as low as possible, within the objects of the invention, to provide maximum corrosion protection.

Thus, for example, within the general proportions set forth above, the amount of water may be as low as possible to enhance the quality of the coating but not so low as to saturate the metal ($M^{+2}$) ion. Moreover, the amount of water should be sufficient to allow complete hydrolysis of the silane(s). Otherwise, if there is insufficient water the siloxanes tend to cyclicize to form oily resins rather than hard films. When only methyl silanol (from methyl trialkoxysilane) is used, the amount of metal cation ($M^{+2}$) will be based on the amount of silanol. When mixtures of silanol are used it is convenient to convert the molar silane sesquioxide equivalent of the remaining silane mixture to the molar equivalent of methyl silane sesquioxide.

The coating composition may be easily prepared by, for example, combining two mixtures. The first is an acidic aqueous solution with or without alcohol or other volatile organic solvent and with or without (preferably without) the addition of minor amounts of a hydrosol, i.e., colloidal silica sol, while the second is nonaqueous and contains a silane such as $RSi(OCH_3)_3$ or other hydrolyzable silane wherein R is as defined above (at least 70%, preferably at least 75% by weight of the silane being $CH_3Si(OCH)_3$), and isopropanol or other compatible volatile organic solvent. The aqueous first portion may be made by first determining the required aliquot of water to meet the VOC requirement and combining with the water first the selected solution of a divalent cation followed by acidification to the desired pH (e.g., using acetic acid) after previously accounting for the possible addition of a colloidal silica sol and the neutralization of its sodium content. The nonaqueous second portion may be formulated by combining the appropriate mixture of silane(s) with or without isopropanol or other volatile solvent. The first and second portions may be combined in any order, however, it is usually preferred to slowly add the second (silane) portion to the aqueous acidic metal cation solution, under stirring. The silane(s) in the resulting mixture hydrolyze to the corresponding silanols which partially condense to form an oligomeric siloxane which is ready for application in a few hours and has application potential for several days. The useful application time of the mixture may be extended by chilling to a temperature exceeding the freezing point of water. Cure of the applied coating mixture may be accelerated by heating nominally to 80° C., however, air curing is preferred.

The following examples are illustrative and are not intended to limit the invention in any way.

EXAMPLE 1

Calcium oxide (0.12 millimoles) is added to 235 grams of water containing 5 grams of glacial acetic acid. The initial pH is 2.8. In a separate container 200 grams of methyl trimethoxy silane is mixed with 200 grams of isopropyl alcohol. While the silane-alcohol mixture is being stirred, the aqueous solution is slowly added. After about 2 hours or when the pH increases to about 3.4, the mixture is ready for application. Coating the oligomeric mixture onto aluminum coupons is accomplished by wiping. After allowing the solvents to evaporate, the coupon is quick-cured at 80° C. for 30 minutes. Following the cure cycle the coupon is subjected to intermittent (one hour on-off cycles) impinging of a salt spray (3% salt concentration) jet set for 80 psi. The test is conducted for up to 1000 hours. No corrosion is observed.

EXAMPLE 2

Calcium oxide (0.42 millimoles) is added to 235 grams of water containing 5 grams of glacial acetic acid. The initial pH is 2.8. In a separate container 200 grams of methyl trimethoxy silane is mixed with 200 grams of isopropyl alcohol. While the silane-alcohol mixture is being stirred, the aqueous solution is slowly added. After about 2 hours or when the pH increases to 3.4, the mixture is ready for application. Coating the oligomeric mixture onto aluminum and steel coupon is accomplished by wiping. After allowing the solvents to evaporate the coupon is quick-cured at 80° C. for 30 minutes. Following the cure cycle as in Example 1 the coupon is subjected to the same salt water test as in Example 1. No corrosion is observed.

EXAMPLE 3

80 grams of silica sol containing 50% silica is added to 155 grams of water. In a separate container, 0.12 millimoles of calcium oxide is added to 5 grams of glacial acetic acid diluted with 40 grams of water. The acidified mixture is then slowly combined with the diluted sol. After this step, the initial pH is 2.8. In a separate container 200 grams of methyl trimethoxy silane is mixed with 200 grams of isopropyl alcohol. While the silane-alcohol mixture is being stirred, the aqueous solution is slowly added. After about 2 hours or when the pH increases to 3.4, the mixture is ready for application. Coating the oligomeric mixture onto aluminum and stainless steel coupons may be accomplished by wiping or spraying. After allowing the solvents to evaporate the coupon is quick-cured at 80° C. for 30 minutes. Following the cure cycle as in Example 1 the coupon is subjected to the same salt spray test as described in Example 1. No corrosion is observed for either the aluminum or stainless steel.

EXAMPLE 4

80 grams of silica sol containing 50% silica is added to 155 grams of water. In a separate container, 0.12 millimoles of calcium oxide is added to 5 grams of glacial acetic acid diluted with 40 grams of water. The acidified mixture is then slowly combined with the diluted sol. After this step, the initial pH is 2.8. In a separate container 200 grams of methyl trimethoxy silane is mixed with 200 grams of isopropyl alcohol. While the silane-alcohol mixture is being stirred, the aqueous solution is slowly added. After about 2 hours or when the pH increases to 3.4, 30 grams of pigmentary PTFE is added. After the PTFE is dispersed the mixture is ready for application. Coating the oligomeric mixture onto aluminum and steel coupons is accomplished by wiping or spraying. After allowing the solvents to evaporate the coupon is quick-cured at 80° C. for 30 minutes. Following the cure cycle as in Example 1 the coupon is subjected to the same salt spray test as in Example 1. No corrosion is observed.

EXAMPLE 5

Calcium oxide (12 millimoles) is added to 100 grams of water containing 5 grams of glacial acetic acid. The initial pH is 2.5. To this mixture is added 200 grams of isopropyl alcohol. In a separate container 180 grams of methyltrimethoxysilane are mixed with 25 grams of gamma-glycidoxypropyl and 19 grams of phenylsilane. The silane mixture is slowly added to the aqueous mixture while stirring. After about three hours or as the pH approaches 3.4, the mixture is ready for application to a substrate, such as steel or aluminum or other metal or to a previously painted metal or plastic surface. The coating may be applied by wiping or brushing. After the applied coating is allowed to dry and cure it may be subjected to the same salt spray test as in Example 1 without corrosion being observed.

In any of the above examples, other ionizable salts or oxides of divalent metals may be used in place of or in addition to calcium oxide. As examples of suitable inorganic or organic salts and oxides mention may be made, for instance, of zinc oxide, chromium oxide, copper oxide, manganous oxide, cobaltous oxide, calcium acetate, zinc acetate, copper formate, zinc nitrate, calcium phosphate and, the like. Usually, salts of strong mineral acids, such as chlorides (from HCl) and sulfate (from $H_2SO_4$) are avoided since these strongly acidic anions can themselves cause corrosion of metal surfaces. Also, depending on the application of the coating composition use of formic acid salts may be undesirable in view of toxicity considerations. On the other hand, salts of propionic acid, while acceptable, are less preferred since, unlike the acetates, the propionates and heavier organic groups tend to not be sufficiently volatile and, therefore, may adversely impact on the properties or appearance of the final coating. For this reason too, acetic acid is the preferred organic carboxylic acid, however, other acids, such as for example, propionic, maleic, glutaric, oxalic acid, etc., may be used.

Also, as will be readily appreciated by those skilled in the art the selection of the metal ion may often be dictated by the particular substrate. For instance, for aluminum metal calcium salts and oxide are highly effective whereas for steel, particularly stainless steel, zinc is a more effective choice.

It may also be appreciated that certain of the divalent metal ions, such as cobalt, do not readily dehydrate and, therefore, use of such metals is less preferable.

As noted in the above examples the compositions are applied to the metal substrate by wiping and/or spraying. Generally, wiping is preferable in that the cured sprayed coatings often have a tendency to appear lumpy and, therefore, for certain applications, such as boat hulls, chrome wheel covers, etc. may be less aesthetically pleasing. The water-like aqueous coatings may be wiped on using, for example, absorbent cloth, paper or sponge, or by a brush. It is possible to apply the composition to the coating implement for transfer to the substrate or the composition may be applied directly to the substrate and then wiped or rubbed onto or over the surface.

In order to assure strong bonding between the oligomeric silicon binder and the substrate the substrate should be clean and slightly acidic. To this end, the substrate may first be cleaned with detergent and acetic acid. It has also been found that the present unpigmented coating compositions may advantageously be pre-applied to the substrate and wiped off before being allowed to cure. Experience of the inventors has shown that the invention coating composition is highly effective in removing dirt and other adherent residues from the pores of the substrate and, therefore, provides an extremely clean top surface layer in the substrate to enhance the formation of chemical bonding between the oligomeric silicon binder and the metal substrate. Preferably, there may be adopted one or more applications of the coating composition to assist in this cleaning function with the composition being removed after each application until the substrate is acceptably clear. The final and actual coating composition is applied in one or more coating layers depending on the specific substrate and end use.

Only a very thin coating is required, such as from about 0.1 mil (0.0001 inch) to about 2 mil, although thinner or thicker coatings may also be useful. Especially where a glossy or shiny appearance is desired the coating thickness will usually be no more than about 0.5 mil to about 1.5 mil but usually, for adequate protection, no less than about 0.1 mil.

For more highly porous substrates or where product appearance is less likely to be important or adversely effected thicker applications or multiple applications of coating may be desirable. This would be the case, for instance, when the substrate is concrete or similar porous material.

As described above, curing of the coating may be accelerated, if desired, by heating up to about 80° C. However, the appearance and quality of the hard, glossy, transparent coating tends to be superior by allowing the coating to dry and cure in the air under ambient conditions.

Representative examples of applications and uses for the invention coating compositions are provided below. Concrete/Rock: The coating can penetrate tile, concrete, cinder block, concrete block, grout, marble, rock, marcite, gunnite, cool-deck (white portland) and similar porous materials, due to its low viscosity consistency and active nature to a great depth. Penetration may range from about 20% of the thickness of the material, to all the way through if it is very porous (e.g., cinder block). To attain a strong chemical bond the surface should first be thoroughly cleaned, e.g., with a power washer and, preferably, thereafter, the surface may further be washed with a mildly acidic solution, such as, 1% acetic acid in distilled water, to insure that any alkalinity from the cleaning solution is removed. The product may then be sprayed on or rolled on the surface. Generally, a coverage of about 50 to 100 square feet per gallon is sufficient.

An initial coating is applied, such as by wiping, spraying, dipping, etc. and allowed to absorb into the pores of the substrate. Areas of heavy absorption may be given additional coating. The single or multiple coating is allowed to dry for about 15 minutes to allow the water and alcohols (VOC's) in the coating to evaporate. Although the resin is not usually completely bonded at this stage, this first coat, which appears to be softened by the water and alcohol of the second coat, will stop penetration and allow the coating to be built up. Whereas, a single heavy coat will likely be absorbed deep into the porous surface and will likely be totally absorbed or appear uneven from variations in porosity. A second heavy coat may be applied to achieve an even appearance. A touch up coat, third coat, may be given to areas that need coating to even the appearance.

The coating, being hydrophobic, tends not to stick to itself; thus, if reapplied on a dried coat it will tend to bead, but it will bond when it dries. On concrete or other rough surfaces, the coating may be applied thick enough to cover the surface without beading up, thus it can be applied to itself. This is not generally the case with metals and plastics where optical quality surfaces are usually necessary or preferred. Metal and Plastics Applications: Cooper, brass, stainless steel, bronze, nibral, silver, gold, chrome, aluminum, titanium, galvanized steel, Dupont Corrian (TM) countertops, gelcoat paint, acrylics, ABS, PBC, and the like may be coated with the invention compositions. The coating is generally applied quite differently to these surfaces than to concrete. In particular, the surface should be very clean to achieve uniform chemical bonding. Furthermore, the coating is highly active. Therefore, it will clean the pores in the metal or plastic and exhume the contamination which generally rises to the surface of the coating. If left in place, this could contaminate or ruin the composition. While external cleaning may be effective in many cases, it has been found that the non-pigmented coating according to this invention is itself a more highly effective cleaner for removing surface (including in the pores) contamination. In this regard, an initial single application of the composition may be applied and then wiped with a clean paper of cloth towel. However, the gross contamination must be taken out so that the coating is not chemically destroyed in composition.

Thus, the subject coating composition has been found to be highly effective as a cleaner leaving less residue to interfere with subsequent applications of the coating composition. Water may be used as a measure of the surface cleanliness by watching the beading or sheeting of the water as it is poured over the surface. As the surface is cleaned and cleared of contaminants there is a difference on how the water rolls off the surface. This change in reaction to the water is used as a measure of cleanliness. Following cleaning, the surface may be pretreated with a ½ to 1% acetic acid/10% isopropanol/distilled water (89 to 89.5%) to adjust the acidity. The pretreatment solution should be liberally sprayed and scrubbed over the surface to rinse any residue and leave the surface slightly acidic for the subsequent coating.

A typical cleaning and coating procedure for metal or plastic applications is next described.

The coating may be applied to a paper or similar light weight cloth towel or wipe, until the towel is saturated but not dripping. Then coating is rubbed onto the surface with the wet paper towel. The surface should appear clear at first, and then, unless the metal/plastic is very clean or not very porous, the appearance will become cloudy. The surface is then wiped with a paper towel wetted with coating, as above, to remove the contamination. This process may be repeated as many times as necessary to attain a clear surface. After ten to twenty minutes, the surface may again cloud. At this time, a paper towel that is only damp with fresh coating composition is used to again clean and coat the surface.

The final dry coating cannot be rubbed off since it is chemically bonded to the surface. To remove the coating it may be loosened by application of solvent, such as, isopropanol, and/or it may be compounded off. The wet layer left from wiping is generally only about one thousandth of an inch (one mil). However, since the coating may contain as little as about 15% solids the dried thickness may be only about 0.5 mil. In this thin layer, the coating optically improves the surface evenness and the surface appears clearer and brighter than the uncoated surface. Basically, any excess is wiped off in the application process. If not, it will form micro-beads on itself and feel rough and not be optically smooth. When repairing or joining up to an area that has already been coated, the "splice" is rubbed until optically clear with an absorbent paper damp with fresh coating. This fills any pores or depressions with coating, but wipes off micro-beads of the reapplied coating that bead on dried coating.

Defects in the coating when dried, may be compounded off and the surface may be recleaned and the coating reapplied as above.

On chrome and some alloys the coating will tend to bead when applied. The coating may be rubbed hard into the metal and then the metal wiped with a paper towel damp with the coating composition to provide an optical shine. The coating on the surface is very thin. Cheaper chromes are substantially improved in color and optical quality. Also cheap flash chromes and plastic hot stamps of foils are significantly improved.

The coating compositions of this invention may be applied to marine vessels, including hulls, keels and other submersed components and these coated vessels will remain corrosion resistant for extended periods usually longer then one year. The coatings are hard; usually hardness of greater than 10 H, and transparent and additionally provide a shiny or glossy glass-like appearance.

When colloidal silica is included in the coating compositions it will be used in only minor amounts. For example, a 50% colloidal silica sol may be used to add silica to a level of up to about 40% of the silane equivalent, calculated as methyl silane sesquioxide. Generally, however, less than about 10 percent by weight, based on the total composition, preferably less than about 6% by weight, especially less than about 2% by weight of the composition may be added. Correspondingly, on basis of total solid content, the amount of colloidal silica is preferably less than about 6% by weight, preferably less than about 4% by weight.

The compositions may be used to provide hard clear glass-like coatings for long term protection of, for example, bright metals on motorcycles and other motorsports equipment, custom automobiles, boats, and yachts. The dried coating is extremely resistant to acids, fuels and oils, salt spray and atmosphere, acid rain, and other corrosive agents found in today's environment. The coating composition may be used to provide protection to polished or chrome high-temperature surfaces such as exhaust systems and heads to eliminate or reduce discoloration. The coatings will protect, for example, chrome, stainless steel, copper alloys, and galvanized steel. The coating chemically bonds to metals and plastics and leaves the surface unavailable for corrosion and is inert to normal environmental conditions and sunlight.

Other specific applications which may be mentioned include coatings for wheels, chromed parts, polished and unpolished aluminum engine parts, exhaust systems, accessories and trim; chrome bumpers, engine trim, alloy wheels, aluminum structural parts, and accessories on restored and custom cars, trucks, off the road, and racing vehicles. Coatings according to the invention will provide long term protection from salt water for boats and yachts. Use of these compositions can replace anodizing on aluminum parts and extrusions, and can be used to refurbish environmentally ravaged anodized aluminum.

The coating compositions may be used for the protection of virtually any oxidizable metal, from stainless steel to copper to brass to anodized aluminum. When applied to a metal surface the resulting coating will effectively resist rusting, pitting, or dulling of the metal.

The compositions may be applied, for example, to tuna towers, outriggers, rails, other topside metals, as well as hulls, keels, etc. The compositions are useful also to protect boat interiors, such as counter tops, marble, light fixtures, and decorative metals, from corrosion.

As apparent from the foregoing description and specific examples, the coating composition of this invention are usually formulated without pigment and provide clear, transparent hard corrosion resistant coatings. However, where desired pigment or other coloring agent may be included in amounts which will not interface with the desired objects. Pigmentary polytetrafluoroethylene (PTFE), generally up to about 50%, especially up to about 30%, based on the silane equivalent, calculated as methylsilanesesquioxide, is a preferred pigment for retaining corrosion resistance.

What is claimed is:

1. An aqueous coating composition comprising a dispersion of divalent metal cations in lower aliphatic alcohol-water solution of the partial condensate of at least one silanol of the formula $RSi(OH)_3$, wherein R is a radical selected from the group consisting of lower alkyl, vinyl, phenyl, 3,3,3-trifluoropropyl, gamma-glycidyloxypropyl, and gamma-methacryloxypropyl, at least about 70 percent by weight of the silanol being $CH_3Si(OH)_3$, acid in amount to provide a pH in the range of from about 2.5 to about 6.2, and said divalent metal cations in an amount of from about 1.2 millimoles to about 2.4 millimoles, per molar equivalent of the partial condensate, calculated as methyl silane sesquioxide.

2. The aqueous coating composition of claim 1, wherein at least about 75 percent by weight of the silanol is $CH_3Si(OH)_3$, 0 to about 20 percent by weight of the silanol is gamma-glycidyloxy propyl silanol and 0 to about 10 percent by weight of the silanol is phenyl silanol.

3. The aqueous coating composition of claim 1, wherein at least about 85 percent by weight of the silanol is $CH_3Si(OH)_3$, 0 to about 12 percent by weight of the silanol is gamma-glycidyloxy propyl silanol and 0 to about 8 percent by weight of the silanol is phenyl silanol.

4. The aqueous coating composition of claim 1, wherein the silanol comprises a mixture of from about 85 to 90 percent by weight of $CH_3Si(OH)_3$, from about 6 to about 10 weight percent of gamma-glycidyloxy propyl silanol and from about 4 to about 8 weight percent of phenyl silanol.

5. The aqueous coating composition of claim 1, wherein about 100 weight percent of the silanol is $CH_3Si(OH)_3$.

6. The aqueous coating composition of claim 1, wherein the silanol comprises a mixture of from about 80 to 95 weight percent of $CH_3Si(OH)_3$ and from about 5 to 20 weight percent of propyl silanol.

7. The aqueous coating composition of claim 1, further comprising colloidal silica sol in an amount to add silica to a level of up to about 40 weight percent of silane equivalent, in terms of methyl silane sesquioxide.

8. The aqueous coating composition of claim 7, further comprising up to about 30 weight percent of pigmentary polytetrafluoroethylene, based on the silane equivalent, calculated as methyl silane sesquioxide.

9. The aqueous coating composition of claim 1, further comprising up to about 30 weight percent of pigmentary polytetrafluoroethylene, based on the silane equivalent, calculated as methyl silane sesquioxide.

10. The aqueous coating composition of claim 1 wherein the divalent metal cations are selected from the group consisting of divalent calcium ions, divalent manganese ions, divalent copper ions and divalent zinc ions.

11. The aqueous coating composition of claim 1 which comprises, on a weight basis, from about 28 to about 71 percent of said silanol, at least about 70% of which is methyl silanol, from about 29 to about 39 percent water, from 0 to about 31 percent volatile organic solvent, and said divalent metal cations.

12. The aqueous coating composition of claim 1 which comprises, on a weight basis, from about 31 to about 71 percent of said silanol, at least about 75% of which is methyl silanol, from about 29 to about 39 percent water, from about 15 to about 30 percent methanol, ethanol, isopropanol or mixture thereof, and said divalent metal cations.

13. A two part aqueous coating composition comprising, as first part thereof an acidic aqueous dispersion of divalent metal cation selected from the group consisting of $Ca^{+2}$, $Mn^{+2}$, $Zn^{+2}$, and $Cu^{+2}$, said dispersion containing sufficient acid to provide a pH of from about 2.2 to about 2.8; and as second part thereof a non-aqueous composition comprising at least one trialkoxy silane of the formula $RSi(OR')_3$, wherein R is a radical selected from the group consisting of lower alkyl, vinyl, phenyl, 3,3,3-trifluoropropyl, gamma-glycidyloxypropyl, and gamma-methacryloxypropyl, and R' is a hydrolyzable hydrocarbyl group, at least about 70 percent by weight of the silane being $CH_3Si(OCH_3)_3$, at least one of the first and second parts further comprising a volatile organic solvent;

whereby, upon mixing the first and second parts, silane will be hydrolyzed to silanol and the silanol will be partially condensed to siloxanol polymer precursor of silane sesquioxide; and wherein the amount of divalent metal cation in the first part is from about 1.2 to about 2.4 millimoles, per molar equivalent of the silane sesquioxide, calculated as methyl silane sesquioxide.

14. A method of forming a hard corrosion resistant coating on a substrate, comprising mixing an acidic aqueous dispersion of divalent metal cation selected from the group consisting of $Ca^{+2}$, $Mn^{+2}$, $Zn^{+2}$, and $Cu^{+2}$, said dispersion containing sufficient acid to provide a pH of from about 2.2 to about 2.8; with a non-aqueous composition comprising at least one trialkoxy silane of the formula $RSi(OR')_3$, wherein R is a radical selected from the group consisting of lower alkyl, vinyl, phenyl, 3,3,3-trifluoropropyl, gamma-glycidyloxypropyl, and gamma-methacryloxypropyl, and R' is a hydrolyzable hydrocarbyl group, at least about 70 percent by weight of the silane being $CH_3Si(OCH_3)_3$, allowing the resulting mixture to stand until the pH increases to at least about 2.5, whereby the silane is hydrolyzed to silanol and the silanol is partially condensed to a siloxanol polymer; wherein the amount of divalent metal cation in the acidic aqueous dispersion is from about 1.2 to about 2.4 millimoles, per molar equivalent of the silane sesquioxide, calculated as methyl silane sesquioxide, and further wherein at least one of the aqueous dispersion and the non-aqueous composition further comprises a volatile organic solvent; applying the resulting mixture containing the siloxanol polymer to a substrate, and allowing the water and volatile organic solvent to evaporate and the siloxanol polymer to cure to silane sesquioxide.

15. The method of claim 14 wherein the step of applying comprises wiping the resulting mixture on the substrate.

16. The method of claim 15 wherein the substrate is aluminum or stainless steel.

17. The method of claim 16 wherein the substrate is a ship's hull.

18. The method of claim 15 wherein the substrate is a painted metal or plastic.

19. The method of claim 14 wherein the substrate is a porous material and the step of applying comprises spraying the resulting mixture onto the porous material.

20. The method of claim 14 wherein the substrate is fiberglass and the step of applying comprises wiping or spraying the resultant mixture on the fiberglass substrate.

21. The method of claim 14 wherein the cured coating is transparent.

22. The method of claim 14 wherein the cured coating has a thickness of from about 0.1 to about 2 mil.

23. A method of forming a hard corrosion resistant coating on a metal or plastic substrate, comprising applying to the substrate an aqueous coating composition comprising a dispersion of divalent metal cations in lower aliphatic alcohol-water solution of the partial condensate of at least one silanol of the formula $RSi(OH)_3$, wherein R is a radical selected from the group consisting of lower alkyl, vinyl, phenyl, 3,3,3-trifluoropropyl, gamma-glycidyloxypropyl, and gamma-methacryloxypropyl, at least about 70 percent by weight of the silanol being $CH_3Si(OH)_3$, acid in amount to provide a pH in the range of from about 2.5 to about 6.2, and said divalent metal cations in an amount of from about 1.2 millimoles to about 2.4 millimoles, per molar equivalent of the partial condensate, calculated as methyl silane sesquioxide, and allowing the aliphatic alcohol and water of the aqueous coating composition to evaporate and the partial condensate to cure to the corresponding silane sesquioxide, whereby a hard corrosion resistant coating is formed on said substrate.

24. The method of claim 23 which further comprises, prior to applying the aqueous coating composition to the substrate, cleaning the substrate to remove dirt and other adherent debris in the pores of said substrate by applying to the substrate a pigment-free aqueous cleaning composition comprising said aqueous coating composition, and removing the aqueous coating composition and any dirt or debris dispersed therein, by wiping the substrate with more of said pigment-free aqueous coating composition.

25. A coated substrate prepared by the method of any one of claims 14, 16, 17, 18, 19, 20, 21, 23 or 24.

* * * * *